(No Model.)

H. L. BARNARD.
FIRE ESCAPE.

No. 278,763. Patented June 5, 1883.

Witnesses:
J. W. Kalb
C. E. Allen

Inventor:
Henry L. Barnard
per Edw. W. Down Atty

UNITED STATES PATENT OFFICE.

HENRY L. BARNARD, OF GREENFIELD, MASSACHUSETTS.

FIRE-ESCAPE.

SPECIFICATION forming part of Letters Patent No. 278,763, dated June 5, 1883.

Application filed February 17, 1883. (No model.)

*To all whom it may concern:*

Be it known that I, HENRY L. BARNARD, a citizen of the United States, residing at Greenfield, in the county of Franklin and Commonwealth of Massachusetts, have invented a new and useful Fire-Escape, of which the following is a true and full specification.

Figure 1:
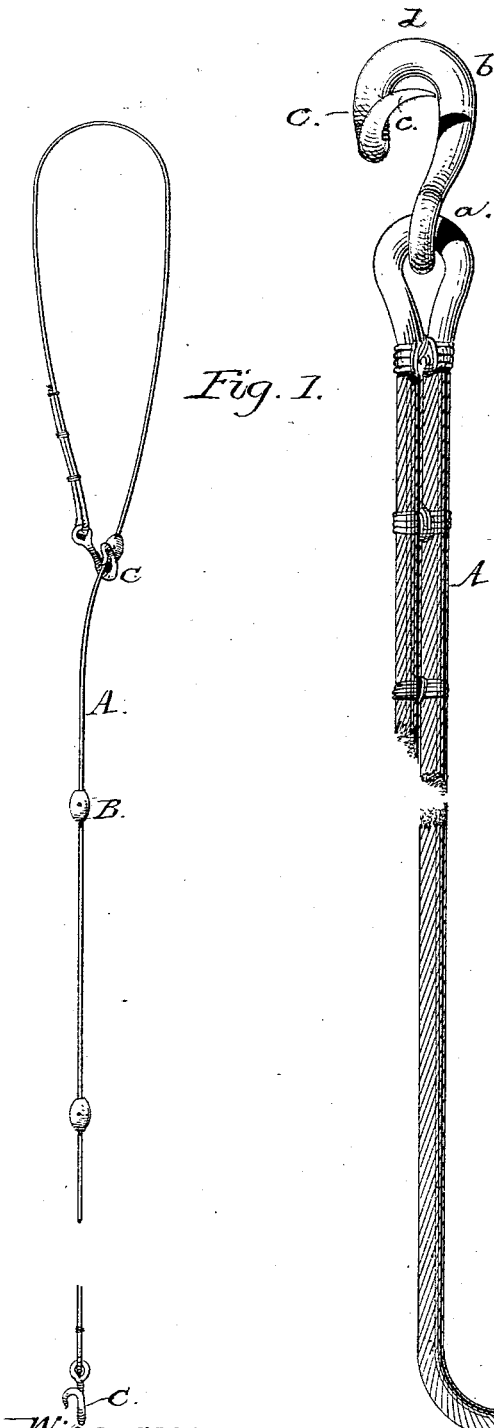
Figure 2:
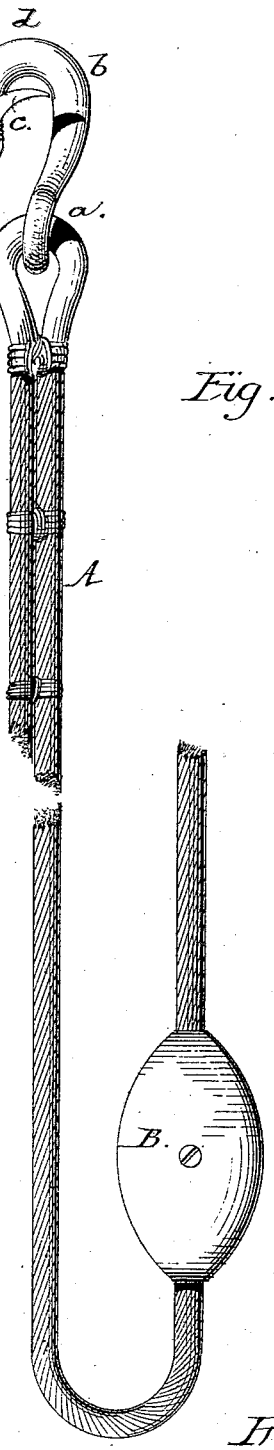

In the accompanying drawings, Figure 1 is an elevation of a portion of the fire-escape. Fig. 2 is an enlarged or full-size view of the same.

The attention of the people of the country, and especially of the traveling portion, is at the present time particularly directed to the danger from fires in burning buildings, and to some practicable means of escape, which shall be immediately at the control of each occupant of any room which may be in a building on fire.

Most of the fire-escapes which have been invented have been permanently attached to a building, or too cumbrous to be carried, or of a description requiring great skill or the most consummate coolness to successfully use them.

My invention consists of a light rope, A, of sufficient length, and of a suitable thickness to sustain the weight of the largest individual likely to use it, and also to occupy as small a space as possible in a trunk or traveling-bag. A five-eighths Manila rope is strong enough to sustain eight hundred pounds, and sixty feet of it weighs but four pounds, and is very compact. On this rope at suitable intervals, for convenience in grasping—say fifteen inches—are fastened oval balls B, about the size and form of hens' eggs. These are bored longitudinally for the rope to pass closely through, and are secured in place firmly by a pin, rivet, or screw passing clear through the balls and rope and headed down on both sides. On each end of this rope, which is to be of any length deemed by a traveler to be necessary for his safety, is a metal hook, C, which need not be over a quarter of an inch in thickness. The bend of this hook is large enough to allow the rope to run readily through it; but it is effectually stopped when it comes against one of the oval balls.

The hook used in connection with the rope and oval balls of my fire-escape is of peculiar form, and it may be described as follows: A piece of iron or steel is formed at one end into an eye, $a$, which serves as a hold for the rope, and it is formed pointed at the opposite end. From the eye $a$ said piece is bent somewhat in an S form, and then bent at $d$ in the form of a U. At right angles to the plane of this U form the piece is again bent, and finally the point $c$ is turned across the field of the said U-bend. It will be seen from the drawings that when the rope is turned upon itself to form a loop for any purpose, and caught at one of the balls by the hook, it (the rope) will be prevented from slipping out laterally by the horn-shaped end $c$ of said hook. The point of the hook, rounded, comes just near enough to the shank to allow the rope to be squeezed through, but so close as to forbid its flying out accidentally. The point of the hook is drawn out and turned around, and upward, if deemed necessary, to secure the rope against slipping back while slack.

As a precaution against the burning of the rope, I propose to saturate it with a solution of tungstate of soda and phosphate of soda, chloride of zinc, or any other common preparation to prevent inflammation.

In practice the escape will be thus used: If a man wished to lower a person—a woman or a child—he would, first securing one end of the rope to a bedstead or any piece of furniture convenient, then make a loop on the other end of the rope, around the chest, under the arms of the person to be lowered, by catching the hook over the rope above the first ball, which, for that purpose, should be about three feet from the hook. This holds the person securely without slipping; and the man who holds the rope will find that the oval balls on it, as drawn over the window-sill, allow him such perfect control that he can lower a heavy person with care and moderation. When a person desires to lower himself, he secures the end of the rope by a loop around some piece of furniture or the rail of the window-sash, or to anything affording a hold, and lets himself down, hand over hand, on the oval balls, which afford all the grip and hold necessary.

My invention is cheap, portable, and effective, always at hand and ready to be used at a moment's warning by any person with only moderate coolness and sense on such an occasion.

What I claim, and desire to secure by Letters Patent, is—

1. The hook C, formed with an eye for a rope at one end, and provided with four bends, and terminating with a horn-shaped guard, substantially as set forth.

2. In a fire-escape, the combination, with the hook described, of the rope A and balls B, all arranged substantially as set forth.

HENRY L. BARNARD.

Witnesses:
JAMES S. GRINNELL,
JOHN F. SPRING.